INVENTORS
ROBERT T. ADAMS
JACK B. HARVEY

United States Patent Office 3,290,676
Patented Dec. 6, 1966

3,290,676
COHERENT FOCUSING RADAR SYSTEM
Robert T. Adams, Short Hills, and Jack B. Harvey, Clifton, N.J., assignors to Sichak Associates, Nutley, N.J., a corporation of New Jersey
Filed Feb. 14, 1964, Ser. No. 345,044
6 Claims. (Cl. 343—7.4)

This invention relates to a self-focusing radar system which acquires and maintains focus on a rapidly moving target in space.

More particularly, this invention relates to a method and system for utilizing two antennas and thus transmitting two signals which are received by and reflected or re-transmitted from the target in phase for enhanced utilization and in which the antennas are properly oriented to detect and track the moving target.

In order to obtain proper focusing on a moving object with a scanning antenna beam, the transmitted signals must be able to be continuously varied in direction. In order to obtain maximum gain or resolution, it is desirable to transmit from more than one antenna. At the same time, when more than one antenna is used, it is necessary for the target to receive signals in phase in order to obtain maximum results which requires a control of the phase of one or more signals.

Briefly, in our invention, we provide in-phase signals at the target. One of the transmitted signals is tagged, preferably with a frequency or phase modulating signal at a characteristic frequency. Any departure from optimum focus produces a small AM component in the echo at the characteristic frequency of the misaligned transmitter. The phase of this AM error signal indicates the sense of the phase error of the individual transmitted component associated with this tagging frequency. The operation of a beam tagging system is fully described and explained in the patent application, Serial No. 231,734, now Patent No. 3,267,380, filed by Robert T. Adams on October 19, 1962, the disclosure of which may be deemed to be incorporated in this application.

The presence of an amplitude modulation component is indicative of phase incoherence. This component is developed and compared with the original tagging frequency which, according to our invention, may be developed or extracted from the reflected signal. Further, the reflected signal carries with it, reference and information components which are utilized to provide continuous scanning control.

The above mentioned and other features and objects of this invention and the manner of attaining them will become more apparent and the invention itself will best be understood by reference to the following description of an embodiment of the invention taken in conjunction with the accompanying drawings wherein.

Figure 1:
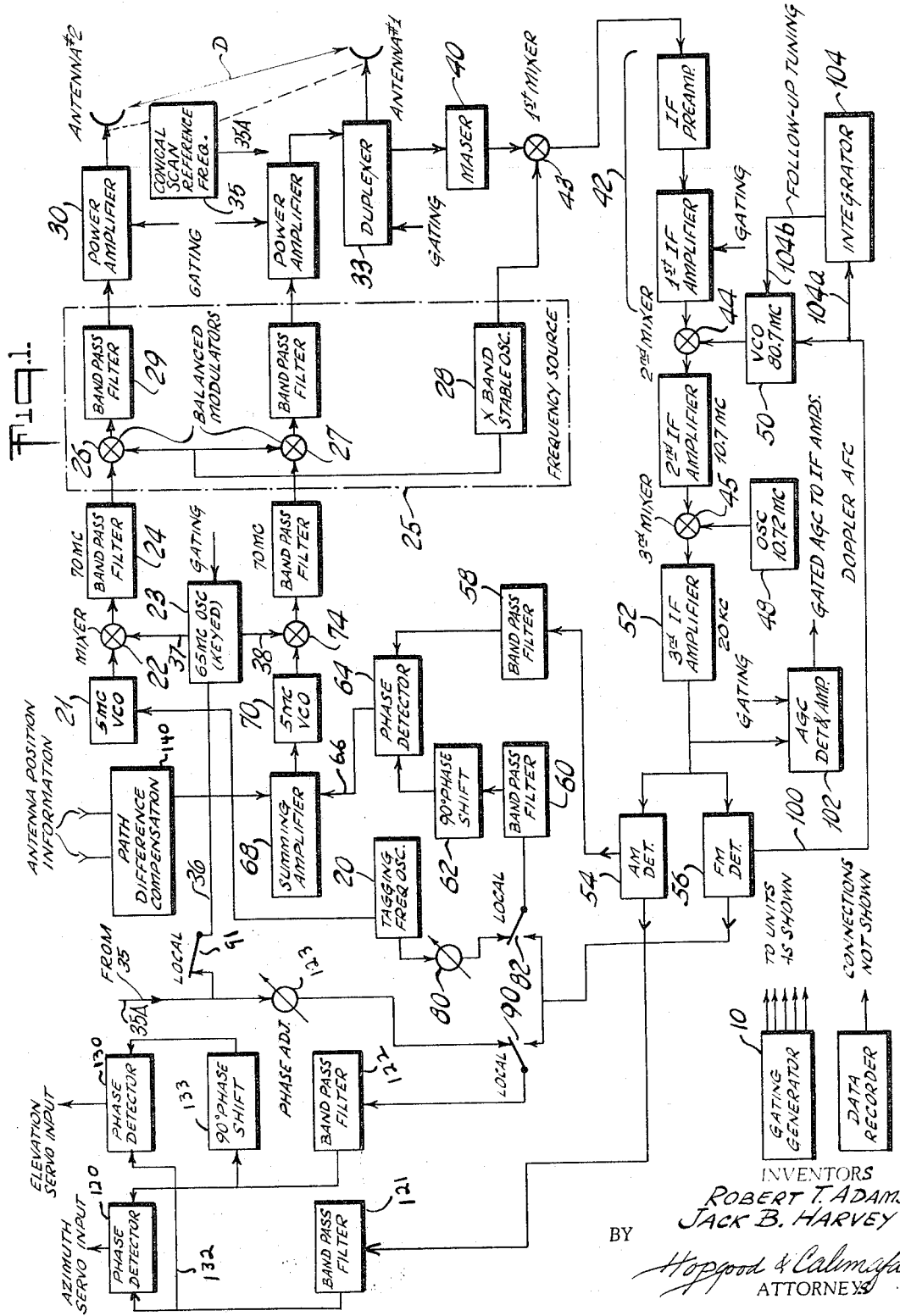
FIGURE 1 shows a detailed block diagram of the system of this invention.

Referring now to FIGURE 1, there are shown transmitting antennas 1 and 2 which are spaced apart a fixed distance D, preferably between 500 to 1000 feet. Antenna 1 is also used as the receiving antenna and is controlled for transmitting and receiving reception by duplexer 33. Imposed on the transmitting carrier frequency is a tagging frequency (87.5 cycles) produced from the tagging frequency oscillator 20. The numbers in parentheses are intended to indicate one set of values which may be used for the invention.

Tagging frequency oscillator 20 modulates a voltage controlled oscillator 21 (5 megacycles), the output of which is applied to mixer 22. Mixer 22 receives, as the other input a carrier frequency or continuous wave frequency (65 megacycles) from oscillator 23 which is periodically gated.

The gating generator 10 is standard and the detailed circuitry and connections are therefore not shown. The output from mixer 22 is applied to a band-pass filter 24 (70 megacycles), the output of which is applied to a unit designated as frequency source 25. Specifically, frequency source 25 contains mixers or balanced modulators 26 and 27, one for each transmitting channel. Each mixer is connected to a common X-band oscillator 28. The output from mixer 26 is applied to power amplifier 30 via filter 29. Power amplifier 30 is gated from generator 10 as is oscillator 23 to produce bursts of RF continuous wave signals.

Oscillator 23 is also modulated by a conical scan reference frequency (30 cycles per second) which is produced by conventional generating means 35, such as a resolver or rotating element coupled to the mechanical rotational shaft of antenna 2. The scan frequency from generator 35 is applied over lead 35A to the input lead 36 to oscillator 23 which in turn applies signals over leads 37 and 38, respectively, to mixers 22 and 74. The signals from oscillators 21 and 70 are modulated by the output from oscillator 23. Thus, the signals transmitted from each antenna 1 and 2 has imposed on it a conical scan reference frequency component and the signal from antenna 2 has imposed on it a tag frequency component. Conical scan means conically scans the antennas and produces a voltage over lead 35A representing the scan. The signals from antennas 1 and 2 are the same except for the tag signal mentioned previously. As a result the scan reference frequency components in each antenna are simply combined when the reflected signal from the object is received.

The receiving circuitry comprises a high gain amplifier such as maser 40 and further amplifying means 42. The output from amplifier 40 is heterodyned through two I.F. stages including mixers 43, 44, 45, each of which has as inputs, respectively, frequency signals from X-band oscillator 28, IF oscillator 48 and IF oscillator 50. Oscillator 50 is a voltage controlled oscillator forming part of the Doppler automatic frequency control loop, described later.

The output from mixer 45 is applied over amplifier 52 to AM detector 54 and FM detector 56. The utilization of AM detector 54 has been described in one aspect in the above mentioned beam-tagging patent application. When the signals received at the target are in phase, the echo from the target received at antenna 1 will not therefore have any amplitude modulation component at the beam-tagging frequency. A band-pass filter (87.5 c.p.s.) 58 tuned to the beam-tagging frequency, assures that only AM signals of the beam-tagging frequency are passed. When the signals received at the target are in phase, the output of the band-pass filter 58 will be zero.

FM detector 56 detects the tagging frequency and applies such tagging frequency through band-pass filter 60 and 90° phase shifter 62 to a phase detector 64.

Phase detector 64 may be a balanced modulator which acts to substantially multiply the two received signals to provide a D.-C. output over line 66 which is plus or minus depending upon the relative phases of the input signals. When the output from the AM detector is zero, the output from the phase detector is zero and thus the input to summing amplifier 68 which is connected to and controls voltage controlled oscillator 70 (5 megacycles) becomes zero. A mixer 74 receives the output from oscillators 70 and 23 and functions as mixer 22 to provide a signal which is ultimately transmitted from antenna 1, although in frequency converted form. To the extent that a phase difference does occur, and an AM output appears from AM detector 54, phase detector 64 produces a corrective signal which alters the instantaneous frequency (hence, the phase) of the voltage controlled oscillator 70.

Coupled between tagging frequency oscillator 20 and band-pass filter 60 is a manual phase shifter 80 and a switch 82 which connects band-pass filter 60 alternatively to FM detector 56 or directly to the tagging frequency oscillator 20.

If the approximate range of the target is known, a phase shift 80 may be manually set so that the tagging frequency for oscillator 20 is delayed by an amount in accordance with the range; the tagging frequency itself becomes the reference signal needed by phase detector 64. In this case, switch 82 is set to "local." The utilization of the local tagging system by the setting of the switch 82 to local provides a control and enhances the capability of the entire system; it also serves as a check to determine whether the FM detecting system is working satisfactorily. When switch 82 is placed in the alternate (downward) position, the reference signal is recovered from the signal which has made the "round trip" as the output from the FM detector. This operation does not require manual setting of phase shifter 80.

The output from AM detector 54 also carries a 30 cycle component from which azimuth and elevation data are obtained. A signal to be supplied as a conventional azimuth servo input is obtained from the output from a phase detector 120 which receives on one side the output from the AM detector through a band-pass filter 121 and receives from the other side the conical scan reference frequency from generator 35 through suitable band-pass filter 122 and a manually operable phase adjusting means 123.

Similarly, the elevation servo input is received as the output from a phase detector 130 which receives the output from the AM detector over conductor 132 as well as the conical scan reference frequency, the latter being applied through band-pass filter 122 and 90° phase shifter 133. The manner by which the azimuth servo input and elevation servo input signals are used is not part of this invention, except insofar as the outputs from detectors 120 and 130 are varied because of a phase difference which may occur.

Switch 90 may be used to provide "local" operation in a similar manner as switch 82. If the approximate range of the target is known, phase shifter 123 may be manually set so that the scan frequency from reference 35 may be used as a reference. Otherwise, switch 90 may be set to the other position and the output from FM detector 56 passes to phase detectors 120 and 130. Switch 91, however, remains closed. FM detector 56 also recovers the 30 cycle component directly from which suitable comparisons may be made in the azimuth servo input correcting circuitry as well as the elevation servo input correcting circuitry.

Those skilled in the art will recognize the manner by which azimuth corrective signals as well as elevational corrective signals are obtained as a result of comparing the original conical scan reference frequency produced at 35 and applied as a modulating signal to oscillator 23 with the phase of the output from the amplitude modulation detector 54. If the outputs from detectors 120 and 130 are zero, then the azimuth and elevation scans will not be affected.

It will be noted, therefore, that the transmitting signal transmits two control functions, and the output from AM detector 54 has two informational components at different frequencies, which are segregated by filters 58 and 121. Also the output from FM detector 56, which recovers the tag frequency and the conical scan frequency has two outputs, segregated by filters 60 and 122. Further, the tag and conical scan reference signals may be local or they may be contained in the transmitted signal so that any phase differences which arise because of path length are automatically compensated.

Because two transmitting antennas are used, Doppler effects require special consideration.

Techniques for removing adverse effects caused by Doppler shifts are well known when one antenna is used. For widely spaced antennas, the difference in Doppler shift may cause significant errors or complete failure of the system unless removed.

It is to be noted that the Doppler considerations here involve two separate matters: The first is the standard Doppler shift which is produced by a target moving away from a transmitter; the second is the relative Doppler effect which is caused from the fact that the target is moving at different directions and velocities away from and toward the respective two antennas. It will be noted that according to the preferred embodiment of this invention approximate corrections are made to compensate for both Doppler shifts.

In order to compensate for the first Doppler shift, a feedback from the frequency modulation detector over loop 100 causes an automatic frequency control of voltage control oscillator 50 (80.7 mc.). The second correction may be obtained through a path difference compensation means 140 which continuously applies or causes a phase shift in the transmitted signal through summing amplifier 68 to also provide a control of voltage control oscillator 70 (5 mc.). The technique of path difference compensation and the use of path difference compensation means 140 is optional but is preferable.

Figure 3:
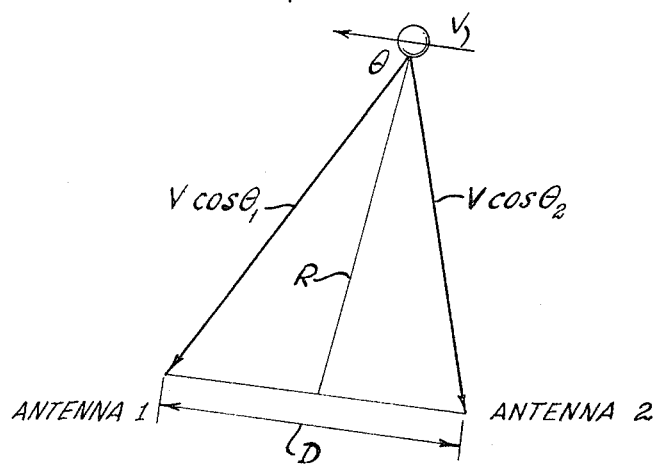
FIGURE 3 is a diagram, illustrating different path lengths from target to the respective antennas.

When two antennas are used, the difference in Doppler shift may be exemplified in the following calculations. Referring to FIGURE 3, $$F_1 - F_2 = KV(\cos\theta_1 - \cos\theta_2)$$

$K = 3 \times$ (frequency in kmc.)
$V =$ target velocity, miles per hour
$\theta =$ angle between target velocity vector and radius vector.

The maximum difference in Doppler frequency is obtained when $$\frac{\theta_1 + \theta_2}{2} = 90°$$

and when the satellite is moving parallel to the line between the antennas, so that $$(F_1 - F_2)\max = 2KV\sin\frac{(\theta_2 - \theta_1)}{2} = \frac{KVd}{f\left[1 + \left(\frac{d}{2r}\right)^2\right]^{1/2}}$$

As an example, for a satellite in a circular orbit at a mean altitude of 1000 miles $V = 13,700$ m.p.h. and for a frequency of 9 kmc.

| Range r | Distance between antennas d | Maximum difference in Doppler frequency, c.p.s. |
|---|---|---|
| 2,000 miles | 100 feet | 3.7 |
|  | 500 feet | 18.5 |
|  | 1 mile | 185 |
| 100 miles | 100 feet | 7.4 |
|  | 500 feet | 37 |
|  | 1 mile | 370 |
| For a mach 2 aircraft, 300 miles | 100 feet | 2.4 |
|  | 500 feet | 12 |
|  | 1 mile | 127 |

The maximum possible Doppler frequency is obtained from $$F = F_0 \cos\theta$$

which yields ±296 kc. at the minimum angle between the satellite velocity vector and the radius vector of 37 degrees, which occurs when the satellite is 5 degrees above the horizon. The maximum rate of change of Doppler frequency is 1300 c.p.s./sec. and occurs when the satellite is directly overhead. The maximum "acceleration" is 4.3 c.p.s./sec.$^2$ and occurs at an angle of ±30 degrees from the zenith on an orbit in which the satellite passes directly overhead.

The uncertainty in initial Doppler frequency determines the receiver bandwidth; the difference in the Doppler frequency received by the antenna elements determines the bandwidth of the IF combining phase control loops. However, since the receiver bandwidth should be considerably smaller than the maximum Doppler shift, the correct Doppler frequency must be obtained quickly so that the system can operate properly. The acquisition bandwidth required is determined as follows:

The error $dF$ due to an angular error $d\theta$ is $$dF = -F_0 \sin \theta . d\alpha$$

The fractional error in Doppler frequency $dF/F$ is $$\frac{dF}{F} = \tan \theta . d\theta$$

An angular error of ½ degree when $\theta=37$ degrees (satellite 5 degrees above the horizon with the plane of the orbit vertical, the worst case) should be allowed for refraction effects, calculation errors, etc. so that $$\frac{dF}{F} = 6.6 \times 10^{-3}$$

Thus, the system must be designed to acquire with an error of approximately ±2 kc.

The first or standard Doppler effect is compensated by taking part of the output from frequency detector 56 and applying the output therefrom to previously mentioned voltage controlled oscillator 50. In order to prevent widespread variations in the VCO 50 from remaining, said variations being produced by fading or other extraordinary circumstances resulting in a substantial change in the output from detector 56, a continuously centering or follow-up means is provided. This centering means is shown as comprising an integration means coupled to the Doppler automatic frequency line over 104a, control through a servo 104 which then resets VCO 50 to a center value over line 104b. That is, assuming that the output from the FM detector causes a wide change in the voltage control oscillator for a short time, once the corrective signal is removed, the output from the integrator will tend to restore the frequency of the voltage control oscillator to its center. It will be apparent that mechanical or electrical follow-ups may be used. The automatic gain control circuitry 102 is conventional.

Figure 2:
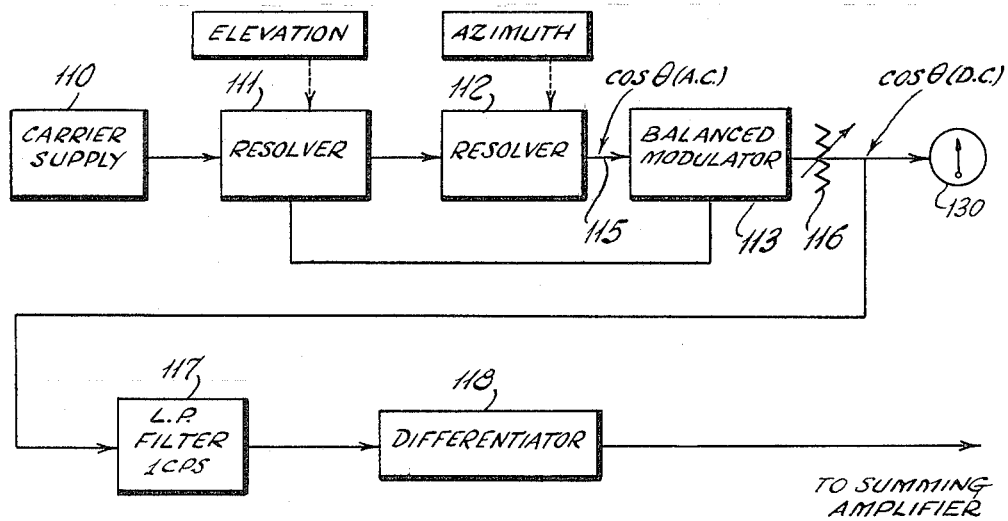
FIGURE 2 is a block diagram of the path difference compensation means illustrated in block form in FIGURE 1.

The path difference compensator 140 for the second effect is shown in FIGURE 2 and comprises a carrier supply 110 which may be at 60 cycles which controls all the resolvers in the system. The output from an elevation resolver 111 essentially multiplies the output from an azimuth resolver 112. If the elevation angle were zero, the output from the azimuth resolver would represent the actual azimuth angle. To the extent that the elevational angle increases, the effective azimuth angle is caused to decrease. This effective azimuth angle is utilized as a prediction of the rate of change of the path difference. That is, the path difference may be considered as the difference between the distance traveled by the signal from antenna 2 to the target and return and the signal from antenna 1 to the target and its return, the returns being with reference to antenna 1. The resolver components are conventional and may comprise potentiometers with mechanically coupled wiper arms.

In order to obtain a D.C. voltage having a polarity which will accurately reflect the sense of the elevation, the output from the elevation resolver 111 is applied to one of the inputs to a balanced modulator 113, the other input being the output from the azimuth resolver over line 115. The output from the balanced modulator 113 is applied over a serially connected potentiometer 116, the magnitude of which is set in accordance with the known ground distance between the two antennas. The meter 130 indicates the output from the potentiometer. The output from the balanced modulator is passed through a smoothing filter 117 (one cycle per second width) and then applied to a differentiator 118, the output of which represents the rate of change of path length. The output from this differentiator is then applied to summing amplifier 68 (FIGURE 1) in order to pass on to VCO 70 a frequency change based upon a predicted phase alteration to thereby compensate for the predicted effect of path difference.

It will be understood that other types of modulation, AM, FM, or PM may be used as the tag signal and necessarily other types of detectors will be used, as explained in the above identified application.

What is claimed is:

1. A system for focusing on a moving object comprising signal source means producing a first signal,
   first and second spaced transmission means,
   means for applying said first signal to each of said transmission means,
   tagging means producing a modulating signal and coupling said signal to one of said transmission means to modulate said first signal,
   scanning means to vary the orientation of said transmission means and providing reference scan signals,
   means to couple said scan signals to each of the said transmission means to modulate the transmitted signals therefrom,
   receiving means coupled to one of said transmission means including AM and FM detector means in parallel to receive the return signal from said moving object,
   means to compare the outputs from said detectors at a first frequency representing the said tagging signal to vary the phase of one of the transmitted signals to provide in phase reception of said signals at said moving target and including means to compare said outputs at a second frequency representing the scan signal frequency to vary the orientation of said scanning means.

2. The system of claim 1 in which the output from the AM detector means is continuously compared with the output from said FM detector means, said FM detector means providing output signals representing the recovered tag and scan reference signals.

3. A system for focusing on a moving object comprising
   a first transmitting channel means for transmitting a first signal,
   a second transmitting channel means for transmitting a second signal,
   a frequency source means providing a carrier frequency coupled to each of said channel means,
   a tag frequency oscillator,
   means for applying the output from said tag frequency oscillator to said first transmitting channel to provide a tag frequency modulation to said first signal,
   said second transmitting channel including duplex means to allow reception,
   AM means coupled to said second transmitting channel through said duplex means in said second transmitting channel to provide detection of AM components from the received signal,
   FM means coupled to said second transmitting channel through said duplex means in said second transmitting channel to provide detection of FM components from the received signal,
   phase detector means responsive to said AM components,
   first reference means to couple said tag frequency oscillator to said phase detector means,
   second reference means to couple the output from said FM means to said phase detector means, and switch means to select one of said first and second reference means and apply the output thereof to said phase detector means, and means responsive to the output of said detector means to vary the phase of said first signal.

4. A communication system comprising diversity transmitting means producing at least two signals in controlled phase relationship to be returned from a target, first means for imposing an identifying modulating signal on one of said two signals, phase means to adjust the phase in one of said two transmitted signals, receiving means to receive a return signal including means to determine the relative phase of one of said signals relative to said identifying modulating signals, means coupled to said receiving means and responsive to said relative phase to control said phase adjusting means, said receiving means including means for optionally comparing the phase of the amplitude modulation component of said return signal with said identifying modulating signals produced by said first means, or said identifying modulating component of said received signal.

5. Means for compensating for Doppler shifts of a moving object where more than one transmitter are employed as a result of difference in location of said respective transmitter or receiver comprising means to provide a first reference correcting signal representing a compensation for said Doppler shift, means to vary said first reference correcting signal in accordance with instantaneous elevation and azimuth information of said object.

6. The system of claim 3 in which each of said transmitting channels include respective scanning antennas, scanning signal means providing reference scan signals in accordance with scanning movement of said antennas, means to modulate said first and second signals with said scan signal, a second phase detector means independently coupled to said AM detector, first circuit means to couple said scanning signal means to said second phase detector means, second circuit means to couple said FM means to said second detector means, and second switch means to selectably couple said first or second circuit means to said second phase detector means.

No references cited.

CHESTER L. JUSTUS, *Primary Examiner.*

T. H. TUBBESING, P. M. HINDERSTEIN, D. C. KAUFMAN, *Assistant Examiners.*